UNITED STATES PATENT OFFICE.

JOHN OSTBERG, OF ST. KILDA, VICTORIA.

RUBBER REPAIRING COMPOUND FOR PNEUMATIC TIRES.

SPECIFICATION forming part of Letters Patent No. 637,018, dated November 14, 1899.

Application filed September 18, 1899. Serial No. 730,915. (No specimens.)

*To all whom it may concern:*

Be it known that I, JOHN OSTBERG, a British subject, and a resident of No. 10 Balston street, St. Kilda, near Melbourne, in the Colony of Victoria, have invented a certain new and useful composition of matter to be used for and as an improved automatic rubber repairing compound for application to the inner tubes of pneumatic rubber tires generally and like purposes, of which the following is a full, clear, and exact specification.

The object of the invention is to provide a plastic composition as a coating for the inner tubes of pneumatic tires that will automatically repair punctures or like injuries in such tubes by inserting itself into the puncture.

My composition consists of the following ingredients combined in the following proportions—namely, pure rubber or rubber cuttings, thirteen ounces; resin, (white,) one and one-fourth ounces; boiled linseed-oil, one ounce, and dextrose, three-fourths of an ounce.

I will now describe the method of compounding the above ingredients. Take thirteen ounces of pure scrap-rubber, rubber cuttings, or the like, place it in a suitable utensil and submit it to heat over a fire until it has dissolved into a thick mass, (taking care to stir the whole briskly and constantly,) but no longer, or it will become too fluid. Then remove it from the fire, take its temperature, which will be 280° Fahrenheit or thereabout, and set it aside to cool till its heat has fallen 20° Fahrenheit below the temperature last taken. Then add one ounce and a quarter of white resin and stir until thoroughly mixed. Then add one ounce of boiled linseed-oil and three-fourths of an ounce of dextrose, (the two last-named ingredients may go in together,) and well mix the whole and stand it aside till its temperature shall have fallen another 60° Fahrenheit or thereabout, when it will be ready for use.

My manual method and means of applying the compound to an ordinary bicycle-bladder may be briefly stated as follows: I disjoint the bladder where the ends meet and spread it out on a level surface in a straight line and turn it inside out. I then stretch the same to its full length firmly and smoothly on a hollow mandrel, consisting of a length of iron pipe or the like, and carefully remove any sulfur from its surface. I then coat the outer surface (for the time being) with the composition in such quantity that when compressed, as hereinafter described, it will measure from an eighth to a sixteenth of an inch, according to the class or size of such bladder, and work it vigorously with the palms of my hands until I have got it as level and dense as possible by that means. I then take the mandrel up and placing it on a hard level surface roll or revolve it backward and forward thereon rapidly and with a hard but even pressure of the hands until it has finally adhered in a dense or impact body to the surface of the bladder. I then dust or dredge the surface of the composition liberally with fine French chalk to prevent the compound sticking when the pressure brings the compound face to face. Then remove the bladder from the mandrel, return it back to its original position, (the coating of compound being then inside,) reconnect and secure the two ends of such bladder together, mount and inflate it in the ordinary way, and the machine may be taken into immediate work; but it is preferable to hang the bladder so coated for from two to three days in a moderate temperature before using it.

For application to a single-tube tire the compound would require to be coated thereon when the tube is being manufactured.

I do not limit the application of my invention to the single purpose herein described, as I am aware that there may be many kindred purposes to which it can be successfully applied.

Having now described my invention, what I claim as new, and desire to secure by Letters Patent, is—

The herein-described compound consisting of pure rubber, resin, boiled linseed-oil and dextrose substantially as set forth.

In witness whereof I have hereunto set my hand in presence of two witnesses.

JOHN OSTBERG.

Witnesses:
JONATHAN BEUR,
LESLIE LAWTON BEUR.